United States Patent [19]

Tomiyasu

[11] Patent Number: 5,712,651
[45] Date of Patent: Jan. 27, 1998

[54] APPARATUS FOR PERFORMING A FULL-COLOR EMULATION ON THE TFT DISPLAY DEVICE

[75] Inventor: Yuichi Tomiyasu, Tokyo, Japan

[73] Assignee: Kabushiki Kaisha Toshiba, Kanagawa-ken, Japan

[21] Appl. No.: 500,083

[22] Filed: Jul. 10, 1995

[30] Foreign Application Priority Data

Jul. 22, 1994 [JP] Japan .................... 6-170909

[51] Int. Cl.$^6$ .................... G09G 3/36
[52] U.S. Cl. .................... 345/88; 345/89; 345/147; 345/149; 345/150
[58] Field of Search .................... 345/88, 89, 87, 345/98, 99, 100, 103, 55, 63, 147, 149, 148, 150, 152, 153; 348/790, 791, 792, 793; 349/33, 34

[56] References Cited

U.S. PATENT DOCUMENTS

| | | |
|---|---|---|
| 4,760,387 | 7/1988 | Ishii et al. . |
| 4,779,083 | 10/1988 | Ishii et al. . |
| 4,998,100 | 3/1991 | Ishii . |
| 5,122,783 | 6/1992 | Bassetti, Jr. . |

*Primary Examiner*—Xiao Wu
*Attorney, Agent, or Firm*—Finnegan, Henderson, Farabow, Garrett & Dunner, L.L.P.

[57] ABSTRACT

When a full-color display is to be performed, the upper 4-bit data of each of R, G, and B video data each having an 8-bit width is used as video data of a TFT type LCD in which a full-color display is to be performed, and the lower 4-bit data is supplied to a frame rate controller (36) arranged to control an STN type LCD. For this reason, 16 gray scale levels expressed by the upper 4-bit data are combined to 16 gray scale levels expressed by the frame rate controller (36), and each of R, G, and B video data can be emulatively expressed on the 16-gray-scale TFT type LCD in 256 gray scale levels. When the frame rate controller (36) is used for a full-color emulation, the full-color display can be realized without increasing the number of circuits.

14 Claims, 9 Drawing Sheets

GREY SCALE 00~15(0Fh) LEVELS
□:OFF ☒:ON

| GREY SCALE LEVEL / FRAME NUMBER | LEVEL 1 (1/16) | LEVEL 2 (1/8) | LEVEL 3 (1/5) | LEVEL 4 (1/4) | ---- | LEVEL 6 (1/3) | ---- | LEVEL 16 |
|---|---|---|---|---|---|---|---|---|
| FRAME 1 | ▦ | | ▦ | ▦ | | ▦ | | |
| FRAME 2 | ▦ | | ▦ | ▦ | | ▦ | | |
| FRAME 3 | ▦ | | ▦ | ▦ | | ▦ | | |
| ---- | ---- | | ---- | ---- | | | | |
| FRAME 16 | ▦ | | | | | | | |

F I G. 4

| LOGIC LEVEL OF SCK2 | LOGIC LEVEL OF LSCK | MONO-GREY-SCALE DATA OF R,G, AND B |
|---|---|---|
| H | H | RL0,GL0,BL0 |
| L | H | RL1,GL1,BL1 |
| H | L | RL2,GL2,BL2 |
| L | L | RL3,GL3,BL3 |

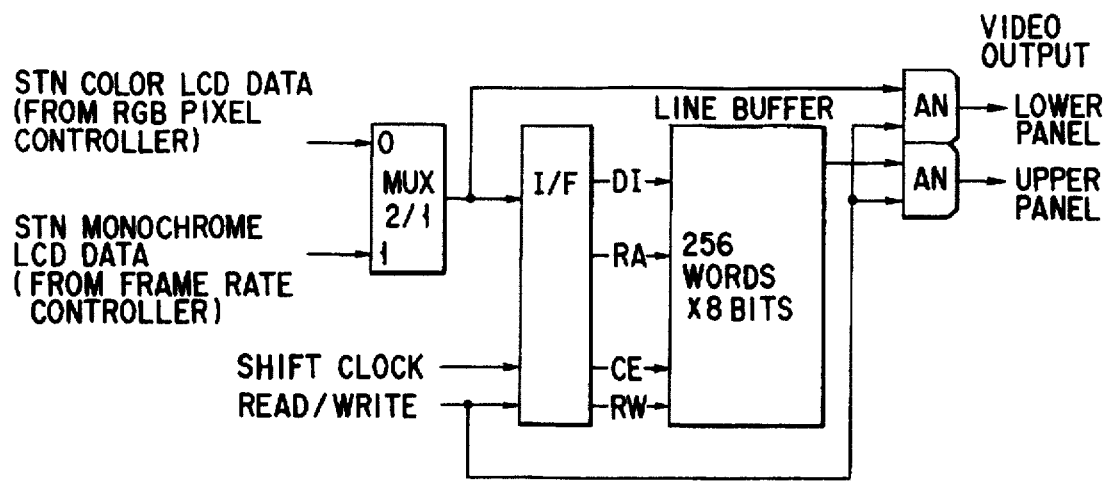
F I G. 8A
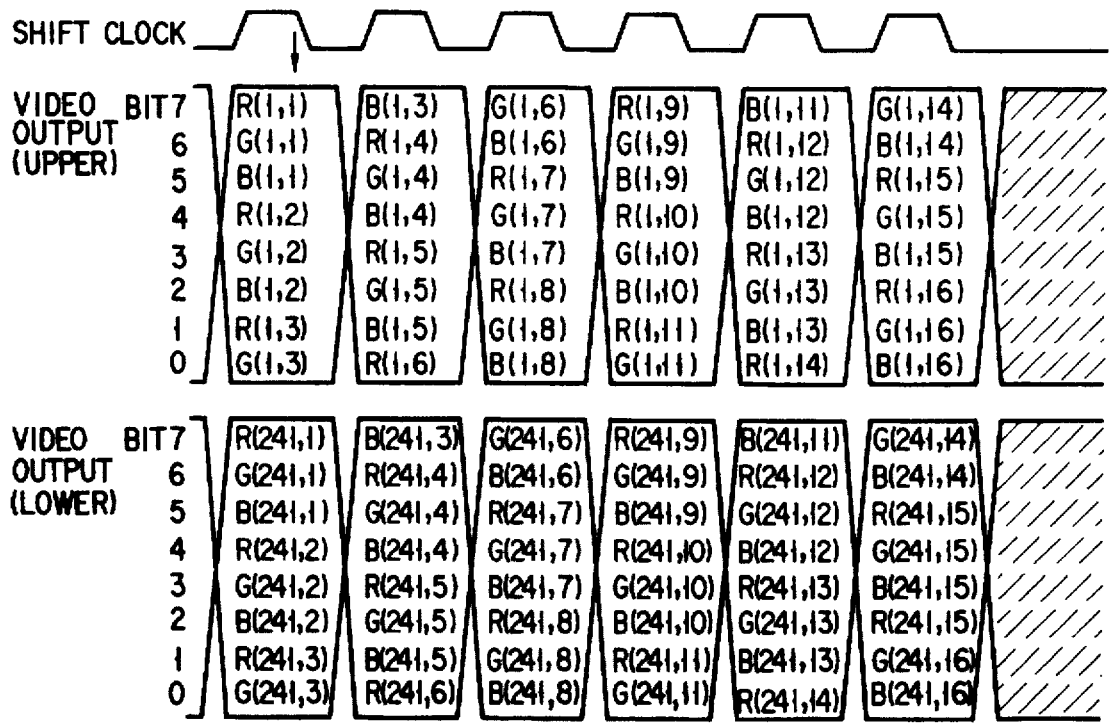
F I G. 8B

APPARATUS FOR PERFORMING A FULL-COLOR EMULATION ON THE TFT DISPLAY DEVICE

BACKGROUND OF THE INVENTION

1. Field of the Invention

The present invention relates to a display control apparatus and, more particularly, to a display control apparatus for a portable computer using a flat-panel display as a monitor.

2. Prior Art

In recent years, as laptop portable computers, various types of notebook portable computers have been developed.

Such a typical portable computer is equipped with a flat-panel display such as an STN type LCD or a TFT type LCD as a standard display, and is designed to be connected to a CRT display as needed.

In an STN monochrome LCD, each dot is expressed by a monochromatic-gray-scale mode (on/off). For this reason, in control of the STN type LCD, a process emulating the monochromatic-gray-scale mode to a multi-gray-scale mode having about 16 gray scale levels is performed. This emulation process is performed by a frame rate controller arranged in a display controller. The frame rate controller performs a dither process for 4-bit/pixel gray scale data in units of frames (scanning frames), and outputs 1-bit/pixel data to the STN type LCD.

In the STN color type LCD, one dot is expressed in a multi-gray-scale mode by R, G, and B video outputs. In the STN color type LCD, the number of gray scale levels which can be expressed by one dot for each color is limited to about 8 (3-bit R, G, and B interfaces=the 3rd power of 2). More specifically, when graphics data having a large number of colors is to be displayed, a gray-scale emulation for emulatively increasing the number of expressed gray scale levels from 8 to about 61 must be performed.

This gray-scale emulation is realized by a 61 gray-sale emulation circuit arranged in the display controller. The gray-scale emulation circuit for an STN type LCD uses, as gray scale data, the upper 4-bit data of 6-bit data output from a brightness conversion circuit, and generates a dither pattern on the basis of the lower 2-bit data and display conditions in horizontal/vertical sync directions. Therefore, a 61-gray-scale display can be emulatively realized on the basis of a 16-gray-scale display. As in the STN type LCD, in the TFT type LCD, the gray-scale emulation circuit is also used when 8 gray scale levels for each of R, G, and B data converted into 58 gray scale levels.

However, a gray-scale emulation circuit (Ser. No. 07/921, 749, U.S. application Date: Jul. 30, 1992, Inventor: Yuuich Tomiyasu, Title of the Invention: Display control device for use with flat-panel display and color CRT display) arranged in a conventional display controller has an arrangement in which intermediate gray scale levels are generated by using 4 types of dither patterns each having 2×2 dots and defined by the lower 2-bit data of video data. In an LCD for a 16-gray-scale (4-bit interface=the 4th power of 2) display, a display cannot be performed in more than 64 (16×4) gray scale levels (in fact, 61 gray scale levels).

For this reason, as in a full-color display, in order to express a larger number of gray scale levels on a flat-panel display, in addition to the gray-scale emulation circuit described above, another gray-scale emulation circuit must be arranged in the display controller.

However, in a full-color display, video data has a data width of 24 bits, and the data width of each of R, G, and B data is of 8 bits. For this reason, the number of gray scale levels expressed by each of 8-bit R, G, and B data becomes 256. Therefore, in order to perform a full-color display on a TFT type LCD for a 16-gray-scale display (4-bit interface), an emulation from 16 gray scale levels to 256 gray scale levels must be performed.

If this emulation is realized by the gray-scale emulation circuit using only the dither pattern described above, 16 types (=256 gray scale levels/16 gray scale levels) of dither patterns each having a size of 4×4 dots must be prepared. For this reason, the display controller increases in scale, and control of the display controller is complicated. Therefore, an emulation for a full-color display cannot actually be realized.

SUMMARY OF THE INVENTION

The present invention has been made in consideration of the above circumstances, and has as its object to provided a display control apparatus which makes it possible to use a frame rate controller, arranged to control an STN type LCD, as a gray-scale emulation circuit for a full-color emulation and can realize a full-color display on a flat-panel display having a small number of gray scale levels without increasing the number of circuits (the number of parts).

A display control apparatus according to the present invention comprises frame rate control means for outputting monochromatic-gray-scale data for turning on/off a dot to be displayed on the flat-panel display for performing a monochromatic-gray-scale display in accordance with a gray scale value of input video data such that the number of ON flames of dots to be displayed in a predetermined frame period is changed depending on a gray scale value to be expressed, video data conversion means for converting display data stored in a video memory into R, G, and B video data for performing a full-color display in units of pixels to output the R, G, and B video data, addition means for receiving upper bit data in the R, G, and B video data output from the video data conversion means and adding a predetermined value to the upper bit data to output next value data having a gray scale value as a next value of the upper bit data, and video data selection means, operated and controlled on the basis of monochromatic-gray-scale data obtained by inputting lower bit data in the R, G, and B video data to the frame rate control means as the input video data, for selecting one of the next value data and the upper bit data in accordance with the monochromatic-gray-scale data to supply the selected data as video data to the flat-panel display on which a full-color display is to be performed.

In this display control apparatus, a frame rate controller arranged for a flat-panel display such as STN type LCD for performing a monochromatic-gray-scale display is used as a gray-scale emulation circuit for realizing a full-color display on a flat panel display such as a TFT type LCD for performing a multi-gray-scale display.

More specifically, when a full-color display is to be performed, the upper 4-bit data of each of R, G, and B video data each having an 8-bit width is used as video data for the TFT type LCD in which a full-color display is to be performed. The lower four bits are supplied to the frame rate control circuit for conversion between monochromatic-gray-scale data and 16-gray scale data. With this arrangement, 16 gray scale levels expressed by the upper 4-bit data is combined to 16 gray scale levels expressed by the frame rate controller, and each of the R, G, and B video data can be emulatively expressed in 256 gray scale levels on the 16-gray-scale TFT type LCD.

BRIEF DESCRIPTION OF THE DRAWINGS

FIG. 4 is a view showing a dither matrix used by a frame rate controller used in the full-color emulation circuit in FIG. 3;

FIG. 8A is a block diagram showing a line buffer for simultaneously scanning two panels, i.e., upper and lower panels; and FIG. 8B is a timing chart showing video data outputs to an STN monochrome/color LCD.

DETAILED DESCRIPTION OF THE PREFERRED EMBODIMENT

An embodiment of the present invention will be described below with reference to the accompanying drawings.

Figure 1:
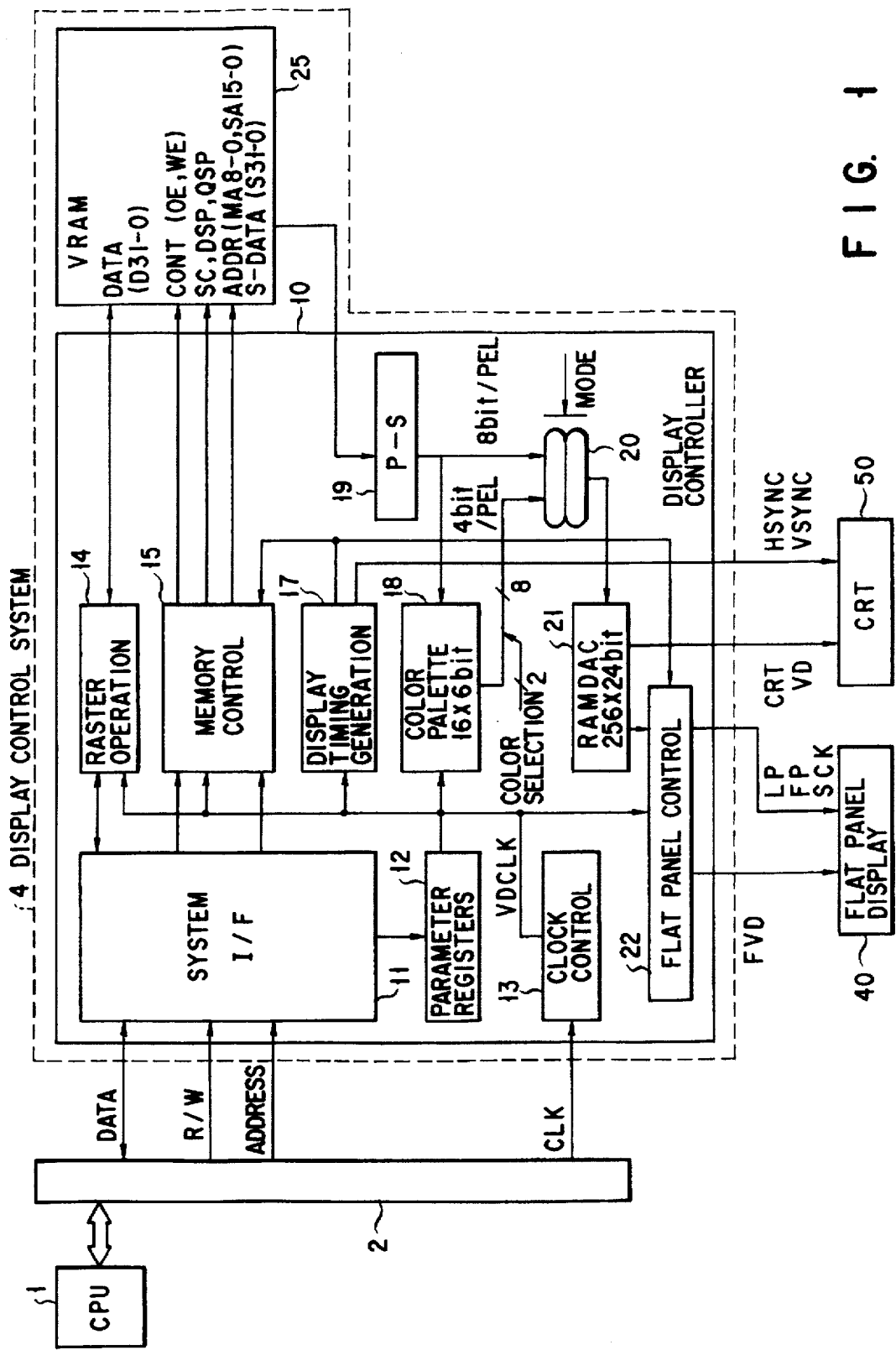
FIG. 1 is a block diagram showing the entire arrangement of a display control system according to an embodiment of the present invention.

FIG. 1 shows the arrangement of a display control system according to an embodiment of the present invention. This display control system 4 is a display control system having, SVGA (Super Video Graphics Array) specifications as VGA (Video Graphics Array) specifications. The display control system performs display control for a flat panel display 40 equipped on a portable computer main body as a standard display and a color CRT display 50 optionally connected to the portable computer main body.

This display control system 4 comprises a display controller 10 and an image memory (VRAM) 25. The display controller 10 and the VRAM 25 are mounted on a circuit board (not shown).

The display controller 10 is one LSI realized by a gate array and constitutes the main part of the display control system 4. The display controller 10 is coupled to a CPU 1 of a portable computer through a local bus 2 (e.g., a VL bus or a PCI bus) and draws data in the VRAM 25 in accordance with a request from the CPU 1. The display controller 10 converts the data drawn in the VRAM 25 into video data to output the video data to the flat panel display 40 or the color CRT display 50, thereby performing display refresh for the flat panel display 40 or the color CRT display 50.

The VRAM 25 stores display data to be displayed on the flat panel display 40 or the color CRT display 50. The VRAM 25 (2M VRAM×2 or 4M VRAM×2) is a dual-port memory having A and B bank arrangements and has a dynamic RAM and an SAM (serial access memory). Random access to the RAM is executed through a random access port (DATA), and serial access to the SAM is executed through a serial access port (S-DATA). In this case, the serial access port (S-DATA) is used to read out data for display refresh. In addition, the random access port (DATA) is used to update data. For this reason, the VRAM 25 can update the contents of the VRAM 25, and, at the same time, can read out the data for display refresh.

Figure 6A:
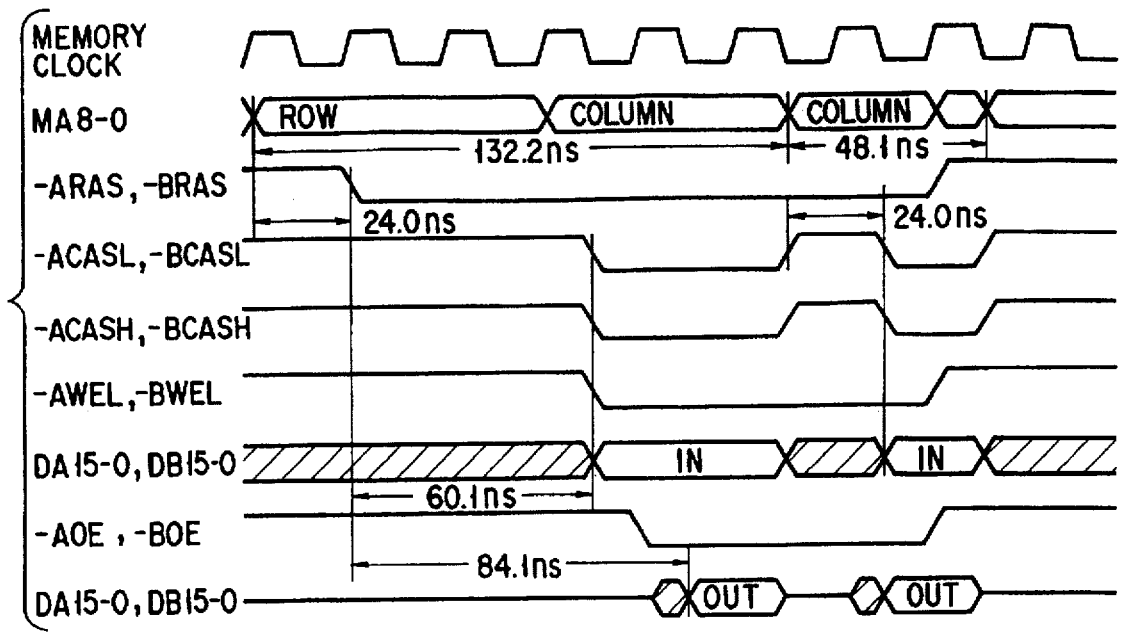
FIG. 6A is a timing chart showing a memory read/write operation from a CPU to a VRAM.
Figure 6B:
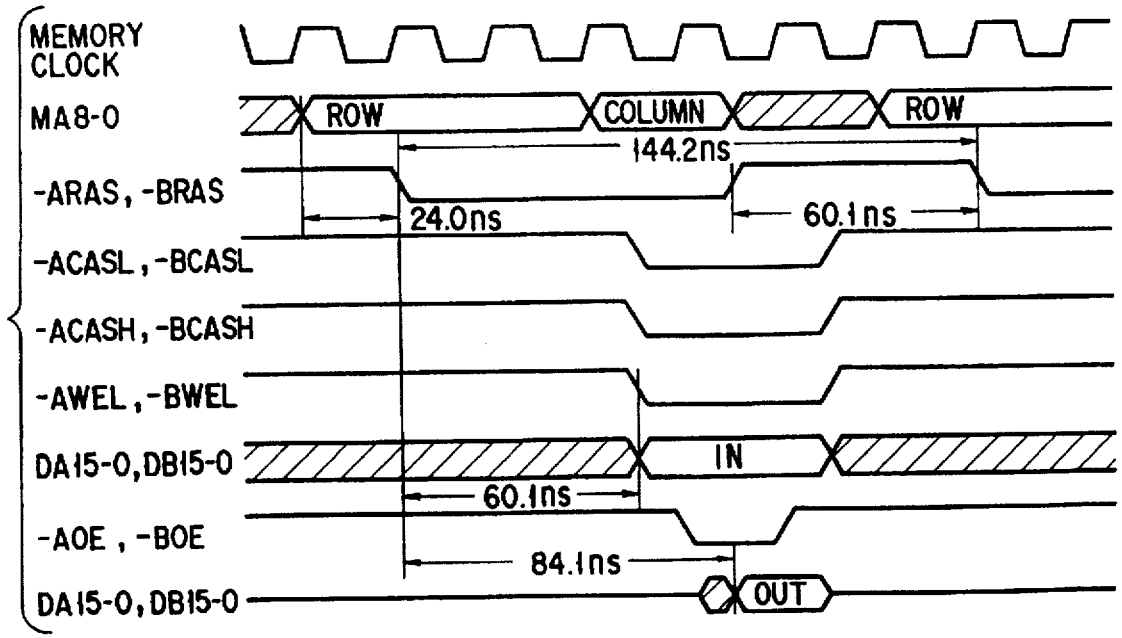
FIG. 6B is a timing chart showing a high-speed memory read/write operation from the CPU to the VRAM.
Figure 6C:
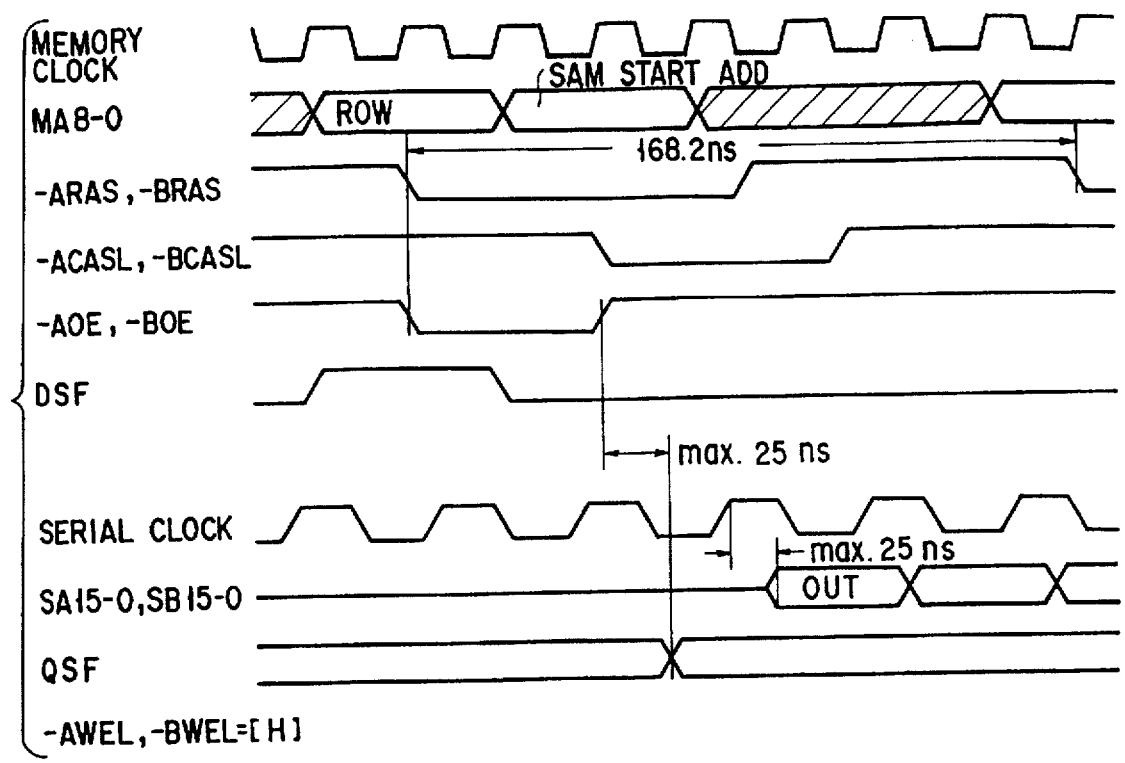
FIG. 6C is a timing chart showing a memory read operation of a VRAM using an SAM output in a graphics mode.

FIGS. 6A, 6B, and 6C show the timings of a read/write operation of a video memory in/from the CPU and display read timings in a graphics mode.

Reference symbol MA8-0 denotes the memory address of a parallel port; ARAS/BRAS, a control signal for a ROW; ACASL•H/BCASL•H, a control signal for a COLUMN; AWEL/BWEL, a write enable signal; DA15-0•DB15-0, input/output data from/to the parallel port; AOE/BOE, an output enable signal; DSF, a signal for enabling data from the SAM to be input/output; QSF, a signal for outputting data from the left 128 columns or the right 128 columns of 256 columns to the SAM; and SA15-0•SB15-0, output data from the serial port.

The display data is stored in the VRAM 25 in a predetermined data format. As the data format, 4 bits/pixel, 8 bits/pixel, or the like is used. Since the serial port (S-DATA) of the VRAM 25 which is accessible at a high speed has a 32-bit width, 4-bit/pixel memory data of 8 dots or 8-bit/pixel memory data of 4 dots can be simultaneously read out from the serial port.

As shown in FIG. 1, the display controller 10 comprises a system interface 11, parameter registers 12, a clock controller 13, a raster operation circuit 14, a memory controller 15, a display timing generation circuit 17, a color palette 18, a parallel-serial converter 19, a multiplexer 20, a RAMDAC 21, and a flat panel controller 22.

The system interface 11 exchanges system data or the like with the CPU 1 through the local bus 2. The parameter registers 12 are arranged for the system interface 11. In the parameter registers 12, the display modes (a text mode, a graphics mode, various clean modes for designating the number of display colors and a resolution in the graphics mode, or the like) of the flat panel display 40 and the color CRT display 50, or color data to be written in the color palette 18 are set. The parameters or the color data are written in the registers in accordance with I/O WRITE instructions from the CPU 1.

The clock controller 13 generates a video clock VDCLK or the like on the basis of a 41.612-MHz memory clock or a 14.318-MHz bus clock from the local bus 2. The video clock VDCLK is a sync clock for outputting video data to the flat panel display 40 or the color CRT display 50 in response to the display timing of a corresponding one of the flat panel display 40 and the color CRT display 50. For example, the video clock VDCLK has a frequency of about 28.322 MHz. The frequency of this video clock VDCLK is determined on the basis of the horizontal/vertical scanning frequencies of the flat panel display 40 or the color CRT display 50.

The raster operation circuit 14 has a function of transferring system data from the CPU 1 to the memory controller 15 as write data and a drawing function of executing various raster calculations for display data read from the VRAM 25 by the memory controller 15. During a drawing operation, the display data read out from the VRAM 25 is logically calculated by the raster operation circuit 14, and the calculation result is written in the VRAM 25 again. The contents of the calculation are controlled by the parameters set in the parameter registers 12.

The memory controller 15 is used to perform access control for the VRAM 25. The memory controller 15 performs random access control for the VRAM 25 in accordance with a memory read/write request from the CPU 1, and performs serial access control for the VRAM 25 in accordance with a display timing signal from the display timing generation circuit 17.

Figure 7:
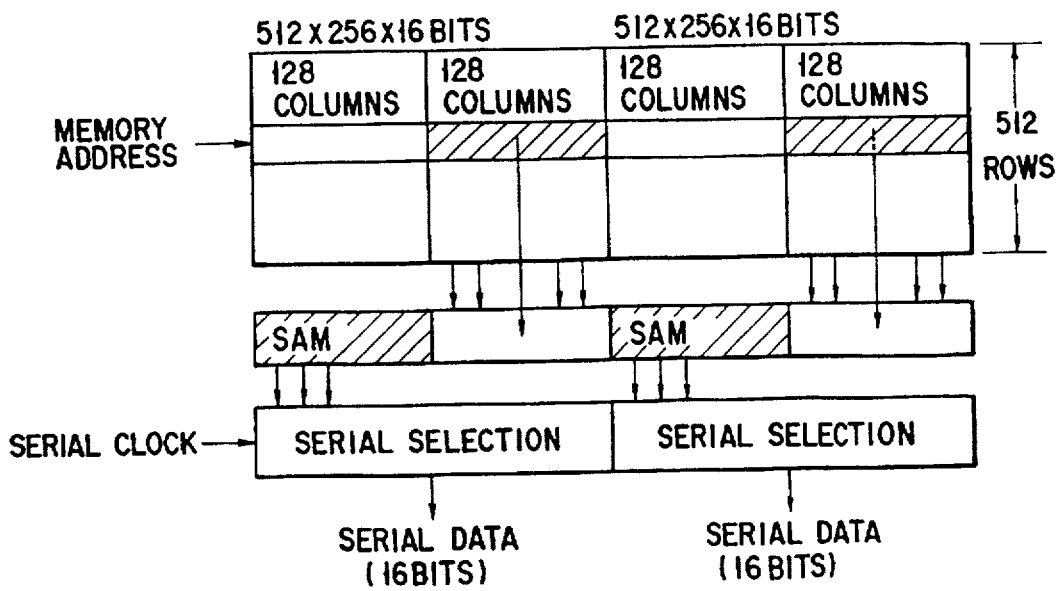
FIG. 7 is a block diagram showing a serial output operation from an SAM port of the VRAM.

The serial control for the VRAM 25 is executed by a data transfer operation from the RAM to the SAM and a serial read operation for the SAM. In the data transfer operation from the RAM to the SAM, one row of the RAM to be transferred is designated by a memory address ADDR from the memory controller 15, and 1-row data is transferred from the RAM to the SAM. In the serial read operation for the SAM, a SAM start address is designated by the memory address ADDR from the memory controller 15, and SAM addresses are sequentially counted up in synchronism with a serial clock SC. In this manner, data are serially read from the SAM in synchronism with the serial clock SC. FIG. 7 shows a serial output from an SAM port. In a graphics mode, the data are serially read using the SAM port. One-row (ROW) data (512 words*32 bits or 256 words*32 bits) in a RAM array selected by a memory address is transferred to an SAM register, and 1-row data is serially read out. When the SAM register is divided into two portions, and a transfer operation is performed between the two portions, next-row data is serially read output without any interrupt.

The display timing generation circuit 17 generates a display timing signal for the flat panel display 40, and supplies the display timing signal to the memory controller 15 and the flat panel controller 22. The display timing generation circuit 17 also generates a horizontal sync signal HSYNC and a vertical sync signal VSYNC for the color CRT display 50.

The color palette 18 is used to determine the color attribute of 4-bit/pixel data output from the parallel-serial converter (P-S) 19 and comprises 16 color palette registers. The 4-bit/pixel data from the parallel-serial converter 19 is input to the color palette 18 as an index, and one of the 16 color palette registers is selected. 6-bit color palette data is set in each color palette register. The 6-bit color palette data read out from the selected color palette register is added to 2-bit color selection data output from a color selection register incorporated in the parameter registers 12, thereby obtaining 8-bit data. This 8-bit data is supplied to the multiplexer 20 as CRT video data.

The parallel-serial converter (P-S) 19 extracts 32-bit memory data (8 pixels in 4 bits/pixel and 4 pixels in 8 bits/pixel), which are simultaneously read from the serial access port (S-DATA) of the VRAM 25, in units of pixels, and serially outputs the memory data. The 4-bit/pixel memory data is supplied to the multiplexer 20 through the color palette 18, and the 8-bit/pixel memory data is directly supplied to the multiplexer 20 as CRT video data.

The multiplexer 20 selects CRT video data from of the color palette 18 or the parallel-serial converter (P-S) 19, and supplies the selected CRT video data to the RAMDAC 21.

The RAMDAC 21 is used to generate R, G, and B analog color CRT video data (CRTVD) for the color CRT display 50. The RAMDAC 21 comprises a color table using 8-bit CRT video data as an index and a D/A converter for converting color data read from the color table into an analog signal. Since 256 colors are simultaneously displayed in a VGA display mode, the color table includes 256 color registers to support the display mode, and one of the 256 color registers is selected by the CRT video data input to the RAMDAC 21. Each color register has a data size of 8 bits for each of R, G, and B data, and stores 24-bit color data consisting of the 8-bit R, G, and B data. In general, lower 6-bit data of each of the 8-bit R, G, and B data is valid. In a full-color display, all 8 bits are effectively used.

The color data stored in the selected color register are supplied to the flat panel controller 22 as digital R, G, and B data, and are supplied to D/A converters incorporated in the RAMDAC 21. The D/A converters convert the digital R, G, and B data into analog R, G, and B signals, and supply the analog R, G, and B signals to the color CRT display 50.

The flat panel controller 22 generates a latch pulse LP, a field pulse FP, and a shift clock SCK in response to the display timing signal from the display timing generation circuit 17, and supplies them to the flat panel display 40. The flat panel controller 22 emulates 18-bit/24-bit digital R, G, and B data from the RAMDAC 21 to video data FVD for the flat panel display 40.

Figure 2:
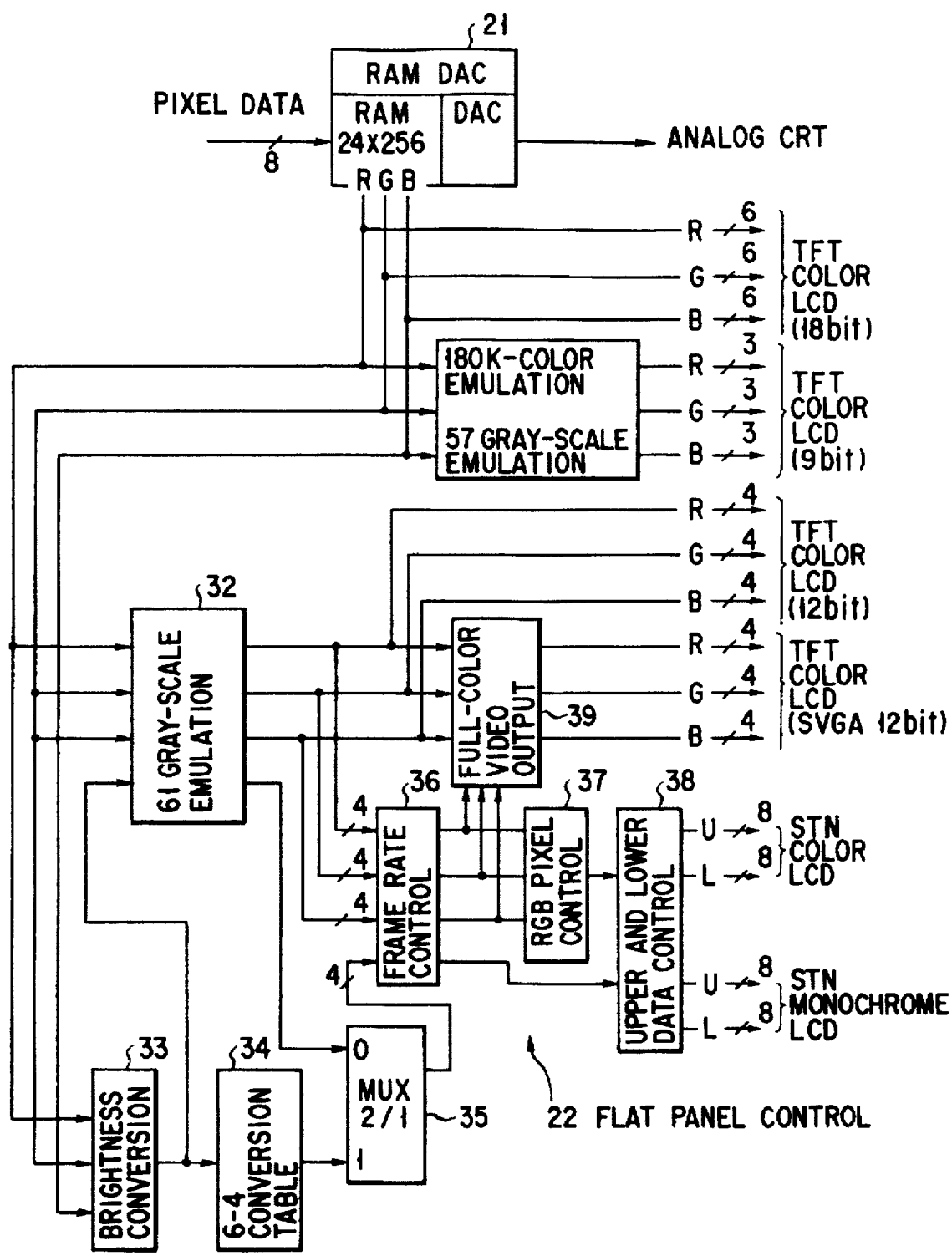
FIG. 2 is a block diagram showing the detailed circuit arrangement of a flat panel controller arranged in the display control system according to this embodiment.

The detailed circuit arrangement of the flat panel controller 22 will be described below with reference to FIG. 2.

The flat panel controller 22 supports display control of a TFT color LCD having a 18-bit video data input (each of R, G, and B has 6 bits), a TFT color LCD having a 9-bit video data input (each of R, G, and B has 3 bits), a TFT color LCD having 12-bit video data input (each of R, G, and B has 4 bits), an STN color LCD, and an STN monochrome LCD. As shown in FIG. 2, the flat panel controller 22 comprises a 180K-color emulation circuit 31, a 61 gray-scale emulation circuit 32, a brightness conversion circuit 33, a 6-4 conversion table 34, a multiplexer 35, a frame rate controller 36, an RGB pixel controller 37, and an upper and lower data controller 38.

(1) Control of TFT Color LCD Having 18-bit Video Data Input

When the TFT color LCD having a 18-bit video data input is to be controlled, 18-bit color data consisting of R, G, and B data each having 6 bits and output from the RAMDAC 21 is directly output as flat-panel video data FVD.

(2) Control of TFT Color LCD Having 9-bit Video Data Input

When the TFT color LCD having a 9-bit video data input is to be controlled, the 180K-color emulation circuit 31 is used as needed. For example, in the 180K-color emulation circuit 31 described in Ser. No. 07/740,168, Title: Color display control apparatus for controlling display gray scale of each scanning frame or each plurality of dots, U.S. application Date: Aug. 5, 1991, Inventors: Hiroshi Uchikoga and Hiroki Zenda, a 57 gray-scale emulation is performed for each of R, G, and B data using combinations between four types of dither patterns each having a size of 2×2 dots and frame control. In this case, the upper 3-bit data of each of the 6-bit R, G, and B data is used as video data of the TFT color LCD, and the lower 3-bit data is used for the dither patterns, or used to perform frame rate control.

For example, when dither patterns each having a size of 2×2 dots are used, each dither pattern indicates the upper 3-bit data or next value data obtained by adding +1 to a gray scale value designated by the upper 3-bit data, which is to be used, in units of dots.

When the upper 3-bit data corresponds to any one of 7 levels from "000" to "110", next value data can be obtained.

For this reason, the number of gray scale levels which can be expressed is given by: 7 levels×8 dithers=56.

When the upper 3-bit data corresponds to "111", next value data cannot be obtained. For this reason, only one dither pattern (dither pattern indicating that the upper 3-bit data is used with respect to all the dots of 3×3 dots) can be used when the upper 3-bit data corresponds to "111". Therefore, the number of gray scale levels expressed when the upper 3-bit data corresponds to "111" is one.

When the 180K-color emulation circuit 31 is used, a total of 57 (57=8×7+1) gray scale values can be expressed for each of R, G, and B data, and a 573=180K-color emulation can be realized.

(3) Control of TFT Color LCD Having 12-bit Video Data Input

When the TFT color LCD having a 12-bit video data input is to be controlled, the 61 gray-scale emulation circuit 32 is used as needed. The 61 gray-scale emulation circuit 32 uses four types of dither patterns each having a size of 2×2 dots to perform a 61 gray-scale emulation for each of R, G, and B data. In this case, the upper 4-bit data of each of 6-bit R, G, and B data output from the RAMDAC 21 is used as video data for the TFT color LCD, and the lower 2-bit data is used to generate a dither pattern.

Each dither pattern having a size of 2×2 dots indicates the upper 4-bit data or next value data obtained by adding +1 to a gray scale value designated by the upper 4-bit data, which is to be used, in units of dots.

When the upper 4-bit data corresponds to any one of 15 levels from "0000" to "1110", next value data can be obtained. For this reason, the number of gray scale levels which can be expressed is given by: 15 levels×4 dithers=60.

When the upper 4-bit data corresponds to "1111", next value data cannot be obtained. For this reason, only one dither pattern (dither pattern indicating that the upper 4-bit data is used with respect to all the dots of 2×2 dots) can be used when the upper 4-bit data corresponds to "1111". Therefore, the number of gray scale levels expressed when the upper 4-bit data corresponds to "1111" is one.

When the 61 gray-scale emulation circuit 32 is used, a total of 61 (61=15×4+1) gray scale values can be expressed for each of R, G, and B data, and 221K-color (=613 colors) display can be realized.

(4) Control of STN Color LCD

When the STN color LCD is to be controlled, the frame rate controller 36, the RGB pixel controller 37, and the upper and lower data controller 38 are used. In addition, the above 61 gray-scale emulation circuit 32 is used as needed.

When the 61 gray-scale emulation circuit 32 is not used, the upper 4-bit data of each of 6-bit R, G, and B data output from the RAMDAC 21 is input to the frame rate controller 36. The frame rate controller 36 outputs R-, G-, and B-monochromatic-gray-scale data ("1" or "0") for turning on/off dots to be displayed in accordance with the gray scale values of the upper 4-bit data such that the number of ON frames of dots to be displayed in continuous 16 frames is changed depending on the number of gray scale levels to be expressed. The R-, G-, and B-monochromatic-gray-scale data are parallelly supplied to the RGB pixel controller 37.

The RGB pixel controller 37 rearranges the R-, G-, and B-monochromatic-gray-scale data in an order of R, G, B, R, . . . , and serially supplies the data to the upper and lower data controller 38.

The upper and lower data controller 38 performs control for simultaneously supplying video data (monochromatic-gray-scale data) to upper and lower panels. In the upper and lower data controller 38, as described in, e.g., Ser. No. 08/327,643, U.S. application Date: Oct. 24, 1994, Inventor: Yuichi Tomiyasu, Title of the Invention: display control method and apparatus for performing high-quality display free from noise lines, a line buffer for storing 1-line video data is arranged. More specifically, as shown in FIGS. 8A and 8B, when a display is to be performed on the STN color LCD, data for the upper panel and data for the lower panel are alternately read from the VRAM 25, and 1-line data for the upper panel is stored in the line buffer of the upper and lower data controller 38. In this manner, the timing of the 1-line data for the upper panel in matched with the timing of the 1-line data for the lower panel, and 8-dot video data for the upper panel and 8-dot video data for the lower panel are simultaneously supplied to the upper and lower panels of the STN color LCD.

(5) Control of STN Monochrome LCD

When display control of the STN monochrome LCD is to be performed, the brightness conversion circuit 33, the 6-4 conversion table 34, the frame rate controller 36, the RGB pixel controller 37, and the upper and lower data controller 38 are used. In place of the 6-4 conversion table 34, the 61 gray-scale emulation circuit 32 is selected by the multiplexer 35 and used, as needed.

The upper 4-bit data of each of 6-bit R, G, and B data output from the RAMDAC 21 is supplied to the brightness conversion circuit 33. The brightness conversion circuit 33 converts the color of color data consisting of the R, G, and B data into a brightness value corresponding to the values of the R, G, and B data. This brightness conversion is performed by the following equation:

$$brightness\ value = 0.30R + 0.59G + 0.11B \qquad (1)$$

In this brightness conversion, 6-bit brightness data is obtained. This brightness data is supplied to the 6-4 conversion table 34.

The 6-4 conversion table 34 holds conversion data for converting the 6-bit brightness data into 4-bit gray scale data, and is constituted by 64 registers each having a 4-bit width. One of the 64 registers is selected by the 6-bit brightness data, and the 4-bit gray scale data of the selected register is supplied to the frame rate controller 36.

The frame rate controller 36 outputs R-, G-, and B-monochromatic-gray-scale data ("1" or "0") for turning on/off dots to be displayed in accordance with the value of the gray scale data. The R-, G-, and B-monochromatic-gray-scale data are parallelly supplied to the RGB pixel controller 37.

The RGB pixel controller 37 rearranges the R-, G-, and B-monochromatic-gray-scale data in an order of R, G, B, R, . . . , and serially supplies the data to the upper and lower data controller 38. The upper and lower data controller 38 performs control for simultaneously supplying video data (monochromatic-gray-scale data) to the upper and lower panels.

(6) Full-color Emulation for TFT Color LCD Having 12-bit Video Data Input

When a full-color display is to be performed on the TFT color LCD having a 12-bit video data input, the frame rate controller 36 used for controlling the STN monochrome LCD and the STN color LCD and a full-color video data output circuit 39 which is newly arranged to perform a full-color emulation are used.

More specifically, when the full-color emulation is to be performed, 8-bit R, G, and B data are read out from the RAMDAC 21. The upper 4-bit data of each 8-bit data passes through the 61 gray-scale emulation circuit 32, and is supplied to the full-color video data output circuit 39. The lower 4-bit data of each 8-bit data passes through the 61 gray-scale emulation circuit 32, and is supplied to the frame rate controller 36.

In the full-color video data output circuit 39, next value data obtained by adding +1 to a gray scale value designated by the upper 4-bit data is generated in units of R, G, and B data. The next value data or the upper 4-bit data which is to be output is controlled by the monochromatic-gray-scale data from the frame rate controller 36.

In this manner, 16 gray scale levels expressed by the upper 4-bit data are combined to 16 gray scale levels expressed by the frame rate controller 36, so that each RGB video data can be emulatively expressed in about 256 gray scale levels.

Figure 3:
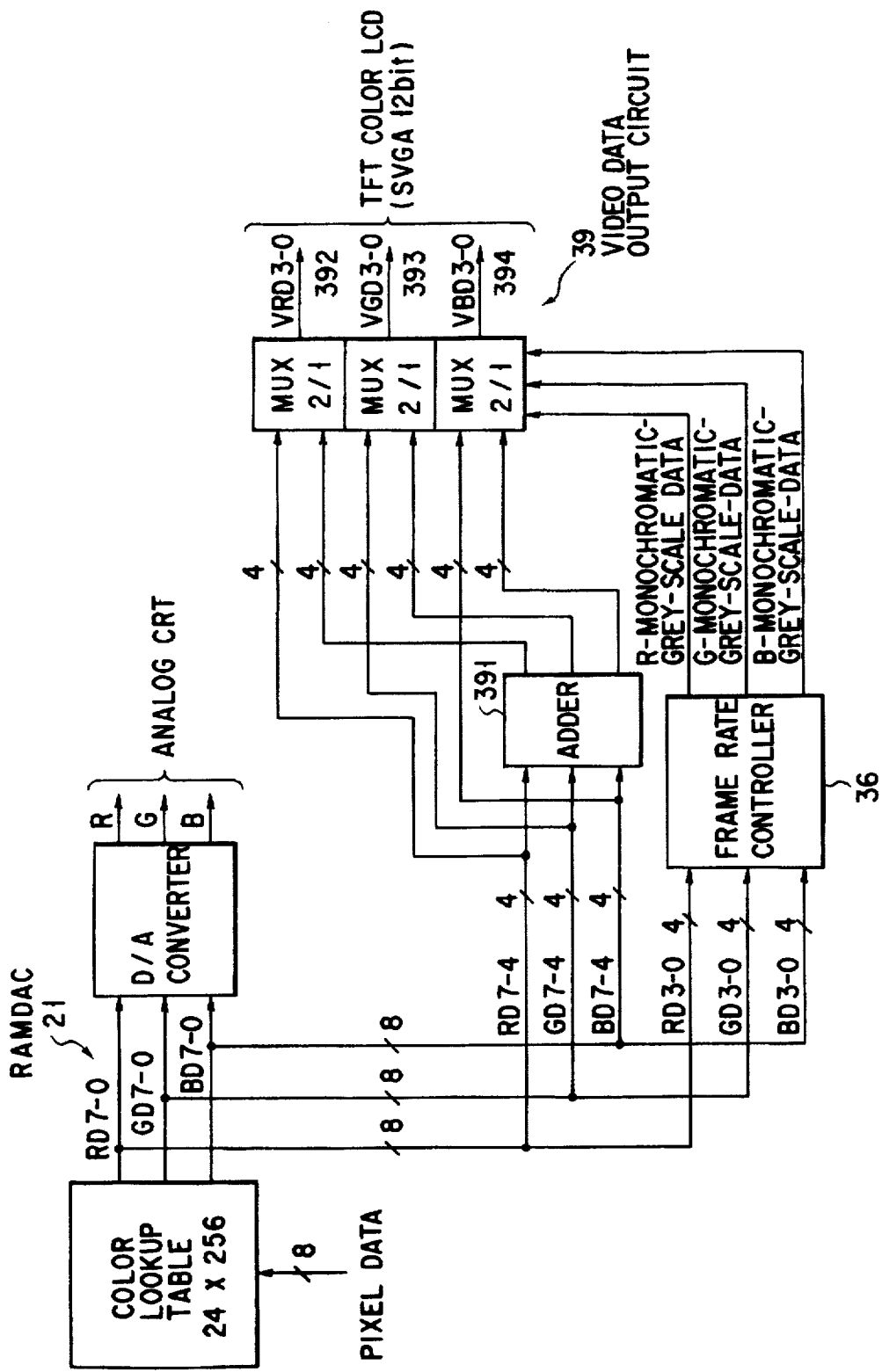
FIG. 3 is a view showing the arrangement of a full-color emulation circuit arranged in the flat panel controller in FIG. 2.

FIG. 3 shows a circuit arrangement of the full-color video data output circuit 39. As shown in FIG. 3, the full-color video data output circuit 39 comprises an adder 391 and first to third multiplexers 392 to 394.

The adder 391 adds "0001" to the upper 4-bit (R7-4) data of the 8-bit R data, the upper 4-bit (G7-4) data of the 8-bit G data, and the upper 4-bit (B7-4) data of the 8-bit B data, respectively. The 4-bit next value data indicating the addition values are output to the first to third multiplexers 392 to 394, respectively.

The first multiplexer 392 inputs the R data (R7-4) and the next value data of the R data output from the adder 391, and one of the data is selected by monochromatic-gray-scale data (R) output from the frame rate controller 36, and is output. In this case, when the monochromatic-gray-scale data (R) indicates an ON state "1", the next value data is selected; when the monochromatic-gray-scale data (R) indicates an OFF state "0", the R data (R7-4) is selected.

The second multiplexer 393 inputs the G data (G7-4) and the next value data of the G data output from the adder 391, and one of the data is selected by monochromatic-gray-scale data (G) output from the frame rate controller 36, and is output. In this case, when the monochromatic-gray-scale data (G) indicates an ON state "1", the next value data is selected; when the monochromatic-gray-scale data (G) indicates an OFF state "0", the R data (G7-4) is selected.

The third multiplexer 394 inputs the B data (B7-4) and the next value data of the B data output from the adder 391, and one of the data is selected by monochromatic-gray-scale data (B) output from the frame rate controller 36, and is output. In this case, when the monochromatic-gray-scale data (B) indicates an ON state "1", the next value data is selected; when the monochromatic-gray-scale data (B) indicates an OFF state "0", the B data (B7-4) is selected.

The operational principle of the frame rate controller 36 will be described below with reference to FIG. 4.

The frame rate controller 36 has 16 types of dither matrixes respectively corresponding to the 16 gray scale levels expressed by 4-bit input data. Frame rate control is performed using these dither matrices. In this case, the dither matrices corresponding to the gray scale levels are prepared in units of frames to prevent a flicker on a display screen.

For example, as shown in FIG. 4, 16 dither patterns corresponding to frame 1 to frame 16 are prepared for a dither corresponding to gray scale level 1. Each dither pattern has a size of 4×4 dots. Any one of the 4×4 dots indicates an ON state (illustrated by a hatched portion), and the remaining dots indicate an OFF state. When the dither patterns are used, each dot is turned on once per 16 frames. In addition, when different patterns are used in units of frames, the adjacent 16 dots constituting the pattern having 4×4 dots are turned on in different frames, respectively. In this manner, ON dots are not concentrated in a specific frame, and a flicker on the display screen can be prevented.

As shown in FIG. 4, three dither patterns corresponding to frame 1 to frame 3 are prepared as dithers corresponding to gray scale level 6. The three dither patterns are repeatedly used in units of three frames. Each dither pattern has a size of 3×3 dots. Any three dots of the 3×3 dots indicate an ON state (illustrated by hatched portions), and the remaining dots of the 3×3 dots indicate an OFF state. When the dither patterns are used, each dot is turned on once per three frames.

In this manner, the 16 types of dither patterns are defined such that a frame period for turning on a dot to be displayed is shortened as the gray scale level of data input to the frame rate controller 36 increases.

Figure 5A:
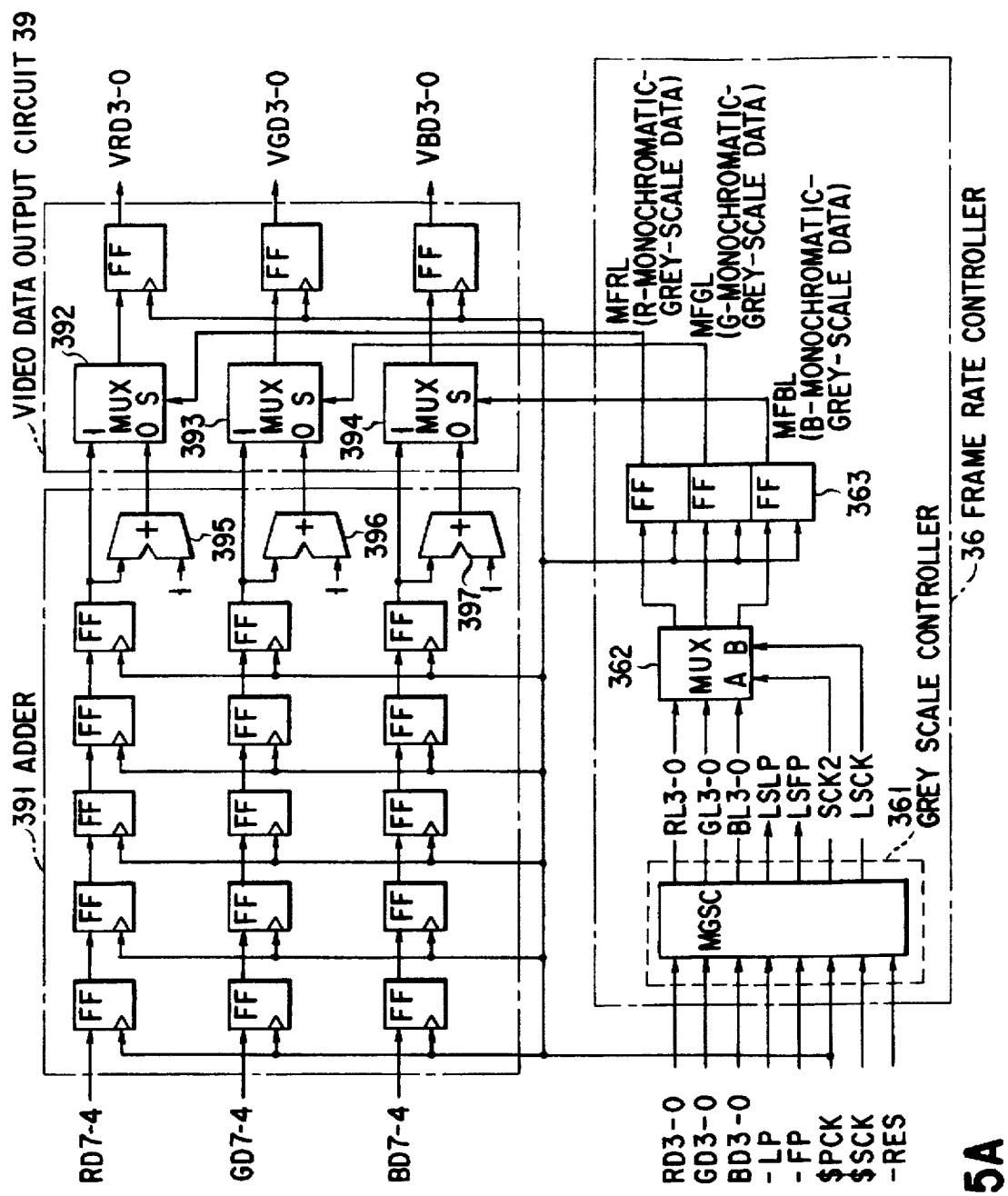
FIG. 5A is a diagram showing the detailed arrangement of an adder, a video data output circuit, a frame rate controller which are used in the full-color emulation circuit in FIG. 3.
Figures 5B, 5C:
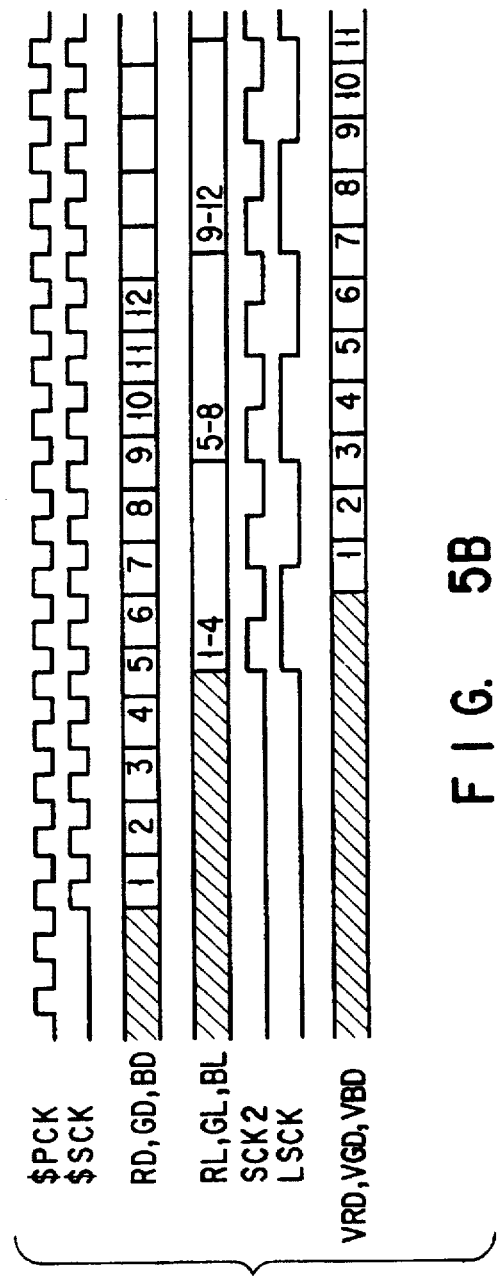
FIG. 5B is a timing chart showing an output operation of 4-bit R, G, and B emulation data to a TFT color LCD having a 12-bit interface.
FIG. 5C is a table showing output selection conditions of a multiplexer 362.

A detailed circuit arrangement of the adder 391, the full-color video data output circuit 39, and the frame rate controller 36 will be described below with reference to FIGS. 5A, 5B, and 5C.

The frame rate controller 36 has three gray scale controllers corresponding to R, G, and B data.

Each gray scale controller selects a dither corresponding to the gray scale value of 4-bit input video data (RD3-0, GD3-0, or BD3-0) from the 16 types of dithers shown in FIG. 4, and outputs monochromatic-gray-scale data (MFRL, MFGL, or MFBL) of "1" or "0" on the basis of the selected dither and data (dot number, line number, and frame number) indicating a current display position. The dot number, line number, and frame number are designated by the output values of a pixel clock ($PCK=Pixel Clock), a line pulse (LP=Line Pulse), a field pulse (FP=Field Pulse), and a shift clock ($SCLK=Shift Clock) which are set in the display timing generation circuit 17 in FIG. 1.

For example, when the R data (RD3-0) is "0000", a gray scale controller 361 selects a dither pattern having 4×4 dots and corresponding to gray scale level 1. At this time, when a pixel position to display the R data (RD3-0) represents the first dot on the first line of frame 1, the value of the dot at the upper left corner of the dither pattern corresponding to frame 1 is selected, and monochromatic-gray-scale data "1" indicating an ON state is output. When the pixel position represents the second dot on the first line of frame 1, the value of the right dot adjacent to the upper left corner of the dither pattern corresponding to frame 1 is selected, and monochromatic-gray-scale data "0" indicating an OFF state is output. In addition, when the pixel position represents the fifth dot on the first line of frame 1, the value of the dot at the upper left corner of the dither pattern corresponding to frame 1 is selected again, and monochromatic-gray-scale data "1" indicating an ON state is output.

When the position of the display pixel is on the fifth line of frame 1, the values of four dots on the uppermost line of the dither pattern corresponding to frame 1 are referred to again. In this manner, the dither pattern corresponding to frame 1 is repeatedly used in horizontal and vertical directions every four dots. For this reason, when the input video data (RD3-0) is "0000", each gray scale controller can determine a reference position in the dither pattern by the lower 2-bit value of data indicating a dot number and the lower 2-bit value of data indicating a line number.

When the R data (RD3-0) is "0101", the gray scale controller 361 selects a dither pattern having 3×3 dots and corresponding to gray scale level 6. At this time, when a pixel position at which the R data (RD3-0) is to be displayed represents the first dot on the first line of frame 1, the value of the dot at the upper left corner of the dither pattern having 3×3 dots and corresponding to frame 1 is referred to, and monochromatic-gray-scale data "1" indicating an ON state is output. When the pixel position represents the first dot on the first line of frame 2, the value of the dot at the upper left corner of the dither pattern having 3×3 dots and corresponding to frame 2 is referred to, and monochromatic-gray-scale data "0" indicating an OFF state is output. In addition, when the position of the display pixel is on the fourth frame, the dither pattern corresponding to frame 1 is referred to again.

As described above, since each gray scale controller 361 uses a dither corresponding to the gray scale level of input video data, the generation rate of monochromatic-gray-scale data indicating an ON state increases as the gray scale level of the input video data increases.

Therefore, when an output from the gray scale controller 361 is used in a full-color emulation, the generation rate of next value data increases as the value of lower 4-bit data increases, and the brightness of a display on the TFT type LCD increases.

In this manner, 16 gray scale levels expressed by upper 4-bit data are combined to 16 gray scale levels expressed by the frame rate controller 36, each of R, G, and B video data can be emulatively expressed in 256 gray scale levels on the TFT type LCD on which a 16-gray-scale display is performed.

In fact, when the upper 4-bit data is "1111", next value data cannot be obtained, and the number of gray scale levels which can be emulatively expressed is 241 (241=15 levels× 16 dithers+1). In this case, in comparison with 16.77 million colors (=256³) of a full-color display on a CRT display, a color display having 13.99 million colors (=241³) can be realized on a TFT display on which a 16-gray-scale display is performed. For this reason, a full-color display having the number of colors equal to that of a CRT display can be realized on the TFT display on which 16-gray-scale display is performed.

The gray scale controller 361 parallelly outputs 4-pixel R-, G-, and B-monochromatic-gray-scale data (RL3-0, GL3-0, and BL3-0) to a multiplexer 362. In addition, the gray scale controller 361 generates a ½ clock SCK2 of a clock $SCK and a ¼ clock LSCK of the $SCK. The multiplexer 362 serially outputs 4-pixel monochromatic-gray-scale data (RL3-0, GL3-0, and BL3-0) to a latch circuit F/F 363 on the basis of the clocks SCK2 and LSCK. The multiplexer 362 selects and outputs one monochromatic-gray-scale data of the 4-pixel data in accordance with the logic levels of the clocks SCK2 and LSCK input to terminals A and B of the multiplexer 362. More specifically, when SCK2=1 and LSCK=1, the multiplexer 362 selects monochromatic-fray-scale data RL=0, GL=0, and BL=0. When SCK2=0 and LSCK=1, the multiplexer 362 selects monochromatic-fray-scale data RL=1, GL=1, and BL=1. When SCK2=1 and LSCK=0, the multiplexer 362 selects monochromatic-fray-scale data RL=2, GL=2, and BL=2. When SCK2=0 and LSCK=0, the multiplexer 362 selects monochromatic-fray-scale data RL=3, GL=3, and BL=3. The latch circuit F/F 363 latches the monochromatic-gray-scale data 9 in synchronism with a pixel clock, and outputs it to terminals S of the video data output circuit 39.

The adder 391 comprises five F/F circuits, and five adder circuits (395 to 397). The five F/F circuits latch video input data (basic value=RD7-4, GD7-4, and BD7-4) in synchronism with the pixel clock, and sequentially output the data to input terminals 1 of the multiplexers (392 to 394) of the video data output circuit 39. Output data from each of the five F/F circuits is input to one input terminal of each adder circuit. The eigenvalue (0001) of each of the five F/F circuits is input the other input terminal of each adder circuit. Output data (next value) from the adder circuits are output to input terminals 0 of the multiplexers (392 to 394) of the video data output circuit 39.

The video data output circuit comprises the multiplexers (392 to 394) and latch circuits F/F. The multiplexers (392 to 394) select basic or next values in accordance with the logic levels of R-, G-, B-monochromatic-gray-scale data (MFRL, MFGL, and MFBL) output from the frame rate controller 36, and output the basic or next values to the latch circuits. When the logic level of the monochromatic-gray-scale data= 1, the multiplexers select and output the next values. When the logic level of the monochromatic-gray-scale data=0, the multiplexers select and output the basic values. The latch circuits latch data values output from the multiplexers (392 to 394) in synchronism with the pixel clock, and output the data values to the TFT color panel 40 as 221 types of color emulation data (VRD3-0, VGD3-0, and VBD3-0).

As has been described above, according to the present invention, when an STN monochrome LCD uses a frame rate controller, which is arranged to control an STN color LCD, for a full-color emulation of a TFT type LCD, a full-color display can be realized on a flat panel display having a small number of gray scale levels without increasing the number of circuits. Since the frame rate controller is designed to control a frame rate using a dither, a flicker disadvantageously generated on a full-color display screen can be prevented.

What is claimed is:

1. A display control apparatus for performing a full-color emulation on a flat panel display, comprising:

frame rate control means (36) for outputting monochromatic-gray-scale data for turning on/off a dot to be displayed on said flat panel display for performing a monochromatic-gray-scale display in accordance with a gray scale value of input video data such that the number of ON flames of dots to be displayed in a predetermined frame period is changed depending on a gray scale value to be expressed;

video data conversion means (21) for converting display data stored in a video memory (25) into n-bit (n: natural number not less than 1) R, G, and B video data for performing a full-color display in units of pixels to output the R, G, and B video data;

adder means (391) for receiving upper m-bit data (m: natural number not less than 1) in the R, G, and B video data output from said video data conversion means and adding a predetermined value (+1) to the upper bit data to output next value data having a gray scale value as a next value of the upper bit data; and video data selection means (392 to 394), operated and controlled on the basis of monochromatic-gray-scale data obtained by inputting lower bit data (n−m) in the R, G, and B video data to said frame rate control means as the input video data, for selecting one of the next value data and the upper bit data in accordance with a value of the monochromatic-gray-scale data to supply the selected data as video data to said flat panel display on which a full-color display is to be performed.

2. An apparatus according to claim 1, wherein said frame rate control means (36) has at least 16 types of dither patterns which are defined in correspondence with the plurality of gray scale values and indicate ON/OFF states of a plurality of adjacent dots, and selects one of the plurality of types of dither patterns in accordance with the gray scale value of the input video data, and outputs monochromatic-gray-scale data for turning on/off the dot to be displayed on the basis of the selected dither pattern, horizontal and vertical display positions ($PCK, $SCK, LP) of the dot to be displayed, and a frame number (FP) of a frame to be displayed in the predetermined frame period.

3. An apparatus according to claim 2, wherein said frame rate control means (36) comprises means for generating the dither patterns defined in units of frames to prevent a flicker on a screen of said flat panel display.

4. An apparatus according to claim 1, wherein said frame rate control means (36) outputs R-, G-, and B-monochromatic-gray-scale data from lower 4-bit (R3-0, G3-0, B3-0) data of the input video data to said video data selection means.

5. An apparatus according to claim 4, wherein said frame rate control means (36) comprises means for latching lower 4-bit data, of 4 pixels, of the input video data, and means for outputting the R-, G-, and B-monochromatic-gray-scale data in synchronism with a pixel clock (PCK).

6. An apparatus according to claim 5, wherein said frame rate control means comprises means for generating a ½ clock (SCK2) obtained by dividing a shift clock by 2, means for generating a ¼ clock (LSCK) obtained by dividing the shift clock by 4, and means for sequentially selecting and outputting each of 4-pixel R-, G-, and B-monochromatic-gray-scale data as 1-bit data in accordance with states of logic levels of the ½ clock and ¼ clock.

7. An apparatus according to claim 6, wherein said frame rate control means is constituted by said latch circuit (F/F 363) for latching 1-bit R, G, and B data in synchronism with a pixel clock ($PCK).

8. An apparatus according to claim 1, wherein said video data conversion circuit (RAMDAC 21) is constituted by a color look-up table, having a register having a 24*256-bit arrangement, for generating 24-bit R, G, and B input data, and a digital-analog converter for converting the input data into an analog value to output the analog value to an analog CRT.

9. An apparatus according to claim 1, wherein said adder means (391) is constituted by an adder circuit having one input terminal for receiving upper 4-bit data of the input video data and the other input terminal for receiving an eigenvalue (0001).

10. An apparatus according to claim 1, further comprising a delay circuit for delaying upper 4-bit data of the input video data input to one input terminal of said video data selection means.

11. An apparatus according to claim 10, wherein said delay circuit is constituted by five F/F circuits synchronized with a pixel clock.

12. An apparatus according to claim 1, wherein said video memory is constituted by a dual-port memory having a random access port and a serial access port.

13. An apparatus according to claim 12, wherein said dual-port memory is constituted by means for selecting and outputting display data from said serial port.

14. A display control apparatus for controlling an STN type LCD and a TFT type LCD, comprising:

frame rate control means (36), arranged to control said STN type LCD, for outputting monochromatic-gray-scale data for turning on/off a dot to be displayed on said STN type LCD in accordance with a gray scale value of input video data such that the number of ON flames of dots to be displayed in a predetermined frame period is changed depending on a gray scale value to be expressed;

video data conversion means (RAMDAC 21) for converting display data stored in a video memory into R, G, and B video data for performing a full-color display in units of pixels to output the R, G, and B video data; and full-color display control means for performing a full-color display on said TFT type LCD, said full-color display control means including adder means (391), for receiving upper bit data in the R, G, and B video data output from said video data conversion means and adding a predetermined value to the upper bit data to output next value data having a gray scale value as a next value of the upper bit data, and video data selection means (39), operated and controlled on the basis of monochromatic-gray-scale data obtained by inputting lower bit data in the R, G, and B video data to said frame rate control means for said STN type LCD as the input video data, for selecting one of the next value data and the upper bit data in accordance with the monochromatic-gray-scale data to supply the selected data as video data to said TFT type LCD, and said frame rate control means comprising means, having a plurality of types of dither patterns which are defined in correspondence with the plurality of gray scale values and indicate ON/OFF states of a plurality of adjacent dots, for selecting one of the plurality of types of dither patterns in accordance with the gray scale value of the input video data, and outputting monochromatic-gray-scale data for turning on/off the dot to be displayed on the basis of the selected dither pattern, horizontal and vertical display positions of the dot to be displayed, and a frame number of a frame to be displayed in the predetermined frame period.

* * * * *